US008333359B2

(12) United States Patent
Gordon

(10) Patent No.: US 8,333,359 B2
(45) Date of Patent: Dec. 18, 2012

(54) JAMB MOUNTING BRACKET AND METHOD OF USE

(76) Inventor: Randy Gordon, Hesperia, MI (US)

( * ) Notice: Subject to any disclaimer, the term of this patent is extended or adjusted under 35 U.S.C. 154(b) by 232 days.

(21) Appl. No.: 12/845,398

(22) Filed: Jul. 28, 2010

(65) Prior Publication Data

US 2011/0024591 A1 Feb. 3, 2011

Related U.S. Application Data

(60) Provisional application No. 61/230,285, filed on Jul. 31, 2009.

(51) Int. Cl.
*F16M 13/00* (2006.01)

(52) U.S. Cl. ...................... 248/547; 248/223.21; 52/213

(58) Field of Classification Search .................. 248/547, 248/221.12, 223.21; 52/204.1, 213, 217
See application file for complete search history.

(56) References Cited

U.S. PATENT DOCUMENTS

| | | | | |
|---|---|---|---|---|
| 1,348,721 | A * | 8/1920 | Ketteringham, Jr. | 52/217 |
| 1,621,213 | A * | 3/1927 | Olson | 411/457 |
| 3,226,781 | A | 1/1966 | Schnabel | |
| 3,430,385 | A * | 3/1969 | Biro | 49/380 |
| 3,490,797 | A * | 1/1970 | Platte | 52/282.1 |
| 4,014,146 | A | 3/1977 | DiMascio et al. | |
| 4,148,454 | A * | 4/1979 | Carlson et al. | 248/222.11 |
| 4,718,195 | A * | 1/1988 | Ortega | 49/380 |
| 4,840,002 | A | 6/1989 | Lovgren | |
| 4,986,044 | A | 1/1991 | Funari | |
| 5,119,609 | A | 6/1992 | Tait et al. | |
| 5,167,073 | A | 12/1992 | Stein | |
| 5,655,342 | A | 8/1997 | Guillemet et al. | |
| 5,692,350 | A | 12/1997 | Murphy, Jr. | |
| 5,771,644 | A | 6/1998 | Kidd | |
| 6,131,361 | A * | 10/2000 | Murphy | 52/712 |
| 6,178,717 | B1 | 1/2001 | Loop | |
| 6,286,274 | B1 | 9/2001 | McKann | |
| 6,293,061 | B1 | 9/2001 | Horak, Jr. | |
| 7,716,886 | B2 * | 5/2010 | Gordon | 52/213 |
| 7,882,662 | B2 * | 2/2011 | Root et al. | 52/126.5 |
| 2004/0060241 | A1 | 4/2004 | Staples | |
| 2008/0222980 | A1 | 9/2008 | Root et al. | |
| 2009/0077910 | A1 | 3/2009 | Gordon | |

* cited by examiner

*Primary Examiner* — Bradley Duckworth
(74) *Attorney, Agent, or Firm* — Waters & Associates; Donald J. Wallace

(57) ABSTRACT

A jamb mounting bracket for a door or window that includes a jamb flange and a wall flange connected at right angles along an edge. The jamb flange includes one or more keyhole slots extending away from the edge from a narrow portion to an enlarged portion. The jamb flange can be installed on a jamb after the jamb has been placed in the wall opening by placing the enlarged portion of the keyhole slot over a pre-installed fastener in the outer side of the jamb and then sliding the jamb flange inwardly until the shank of the fastener is in the narrow portion of the slot. Marks and score lines on the bracket can be used to plumb and properly position the bracket fasteners. Transverse slots extending from the keyhole slot can be used to lock a fastener at a given position along the keyhole slot. Removable tabs position the bracket at the edge of a wall opening.

10 Claims, 6 Drawing Sheets

JAMB MOUNTING BRACKET AND METHOD OF USE

CROSS-REFERENCE TO RELATED APPLICATIONS

This application is based on and claims the priority of Applicant's U.S. Provisional Application No. 61/230,285, entitled JAMB MOUNTING BRACKET, filed Jul. 31, 2009, the disclosure of which is incorporated herein by reference.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO A SEQUENCE LISTING

Not Applicable.

FIELD OF THE INVENTION

The present invention relates to a jamb mounting bracket for mounting a jamb or frame for a door, window, skylight or the like in an opening in a building wall.

BACKGROUND OF THE INVENTION

While the present invention is applicable to brackets for mounting a jamb for a door, window, skylight or the like to a wall opening in a building wall, the present invention will be described specifically in connection with a door frame mounting assembly.

A conventional method for mounting a door jamb in a door opening in a wall is to first install the door jamb in the door opening and then center the door jamb in the opening by means of shims inserted between the rough opening in the wall and the jamb. The jamb or door frame is then nailed to the studs in the door opening.

As an alternative, jamb brackets have been developed. These are typically right angle metal brackets attached between the jamb and the wall surrounding the door opening. Generally, these brackets are packaged separately and attached to a door jamb at the building construction site, with the brackets being nailed or screwed to the surface of the door jamb before the jamb is inserted into the door opening. The jamb is then inserted in the door opening and the brackets are attached to the wall supports surrounding the door opening.

Applicant's co-pending published patent application number 2009/0077910A1, which is incorporated by reference, discloses an alternative type of jamb bracket wherein a separate mounting plate permits attachment of the bracket after the door jamb has been inserted in a door opening.

An object of the present invention is to provide an improved jamb bracket that can be pre-installed on a door jamb so as to simplify packing and simplify the mounting practice on site.

Another object of the present invention is to provide a pre-installed jamb bracket that can be installed on both sides of a door jamb and or in a variety of different types of door openings, including exterior openings wherein exterior door trim, brick molding, or a nailing flange or the like is already mounted on the door assembly and the jamb brackets can only be installed after the jamb is positioned in the door opening.

SUMMARY OF THE INVENTION

In accordance with the present invention, a jamb mounting bracket for mounting a door jamb in a door opening comprises a right angle bracket having a jamb flange and a wall flange joined together at right angles to form an edge, preferably by bending a single sheet of metal. The jamb flange includes one or more jamb attachment slots that extend away from the edge. The slots have enlarged and narrow portions. A screw head fits through the enlarged portion but not through the narrow portion, and a screw shank fits through the narrow portion, such that the jamb flange can be mounted on the screw through the enlarged portion and secured on the screw by sliding the shank of the screw head into the narrow portion. The wall flange has a fastener attachment slot therein that extends in a direction away from the edge. The wall flange is attachable to a wall by extending the fastener through the fastener attachment slot into a wall.

In one aspect of the invention, the bracket includes an alignment tab at the edge that engages an edge of the door jamb in order to position the edge of the bracket at the edge of the door jamb. The bracket desirably has a score line at the base thereof that facilitates breaking or bending the tab so that the edge of the bracket is not stopped by the tab at the edge of the door jamb.

Instead of or in addition to a score line at the base of the tab, the tab can have an opening therethrough that facilitates breaking or bending the tab so that the edge of the bracket is not stopped by the tab at the edge of the door jamb. While a score line on the edge of the tab is preferred, an opening through the tab instead of or in addition to the score line also facilitates bending or breaking of the tab.

In the preferred practice of the present invention, the jamb attachment slots are keyhole shaped slots having an enlarged opening at an end positioned away from the edge and a relatively narrow slot extending from the enlarged opening toward the edge. The screw head fits through the enlarged opening but not through the narrow slot portion.

The slot portion of the keyhole slot can be marked at one or more locations in order to properly position the fasteners for the keyhole slot on the door jamb.

The wall flange has an elongated slot therein extending away from the edge between the wall and jamb flanges. The wall flange can have spaced vertical lines for use in plumbing or properly aligning the jamb with respect to the door frame.

These and other features will hereinafter appear and for purposes of illustration but not of limitation, and the preferred embodiment of the present invention is described in detail below and shown in the appended drawings.

BRIEF DESCRIPTION OF THE SEVERAL VIEWS OF THE DRAWING

FIG. 6A shows the removal of the mounting flange from a storage position on the door jamb in preparation for mounting of the door jamb in a door opening. FIG. 6B shows the door jamb in position in the door opening prior to installation of the jamb flange. FIG. 6C shows the manner in which the jamb flange is mounted by means of the key hole slot on the door jamb after positioning in the door opening and the subsequent attachment of the wall flange to the wall.

DETAILED DESCRIPTION OF PREFERRED EMBODIMENT

Figure 1:
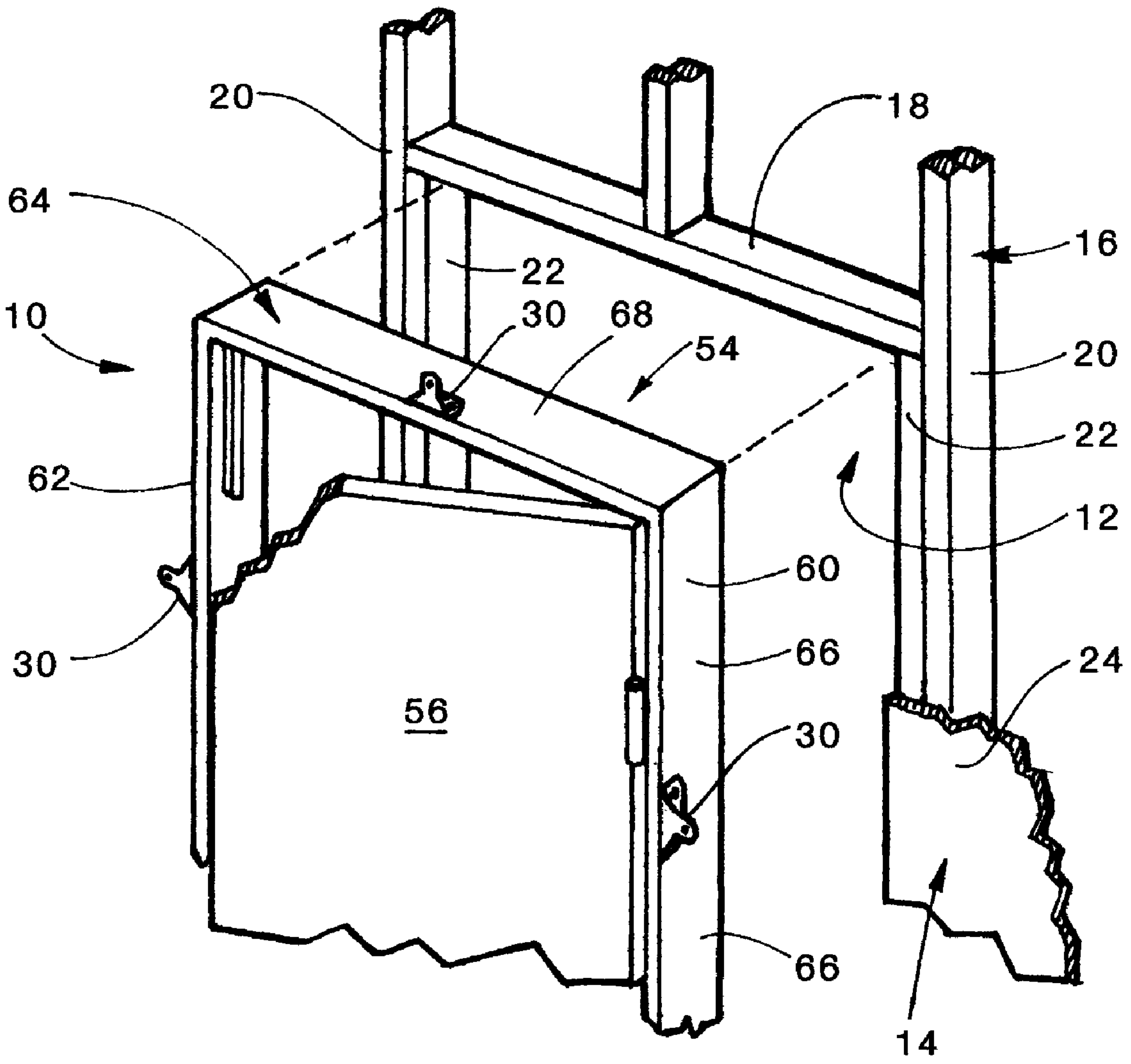
FIG. 1 is a fragmentary perspective view showing the manner in which a pre-hung door assembly is mounted in a door opening in a wall of the building, using the jamb brackets of the present invention.
Figure 3:
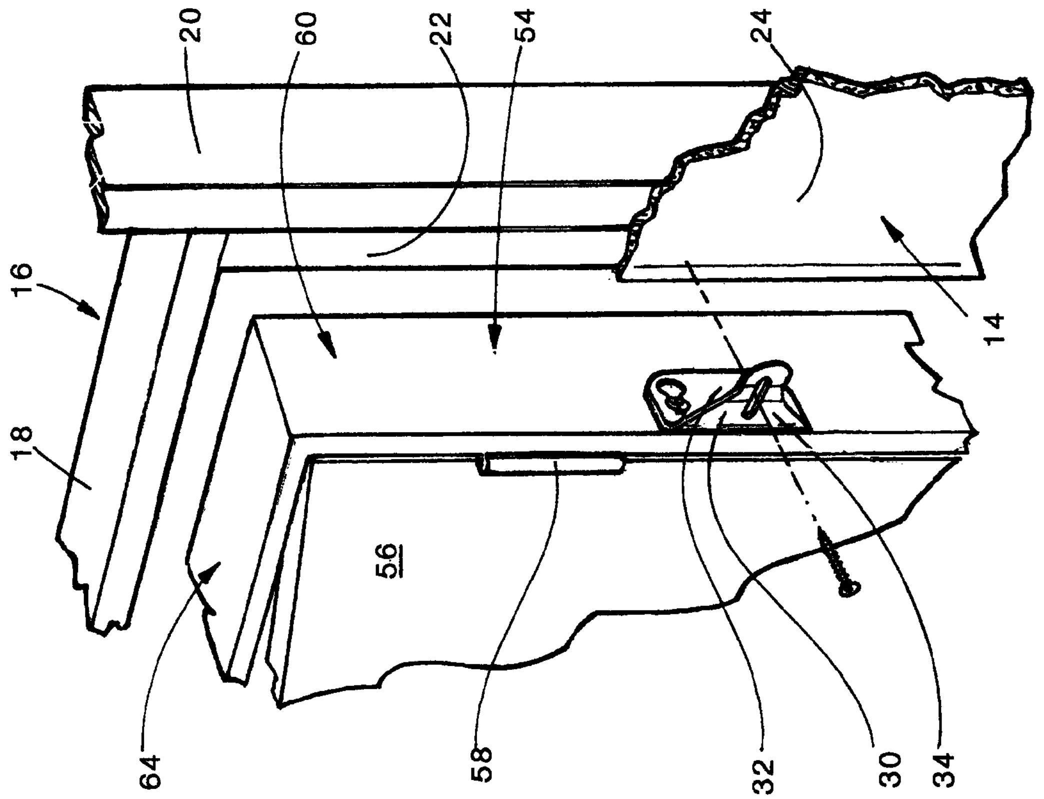
FIG. 3 is a fragmentary perspective view showing the manner in which the flange bracket of the present invention is attached to the outer side of the door jamb for purposes of positioning a pre-hung door assembly in a door opening in a building frame.
Figure 2:
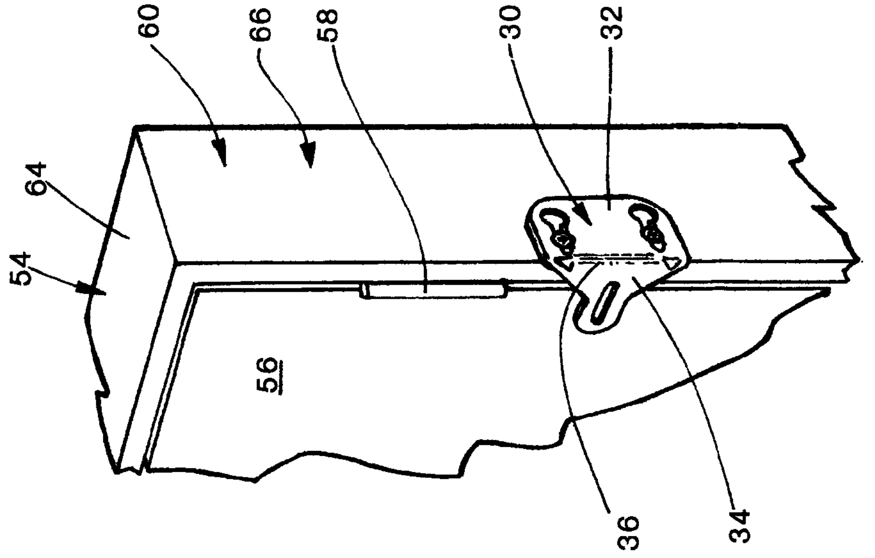
FIG. 2 is a fragmentary perspective view showing the manner in which the jamb bracket of the present invention is attached to the outer side of the jamb for storage and transportation prior to use.

Referring to the drawings, a pre-hung door assembly 10 is shown in FIG. 1 in position to be mounted in a door opening 12 in a building wall 14, wherein the door opening is surrounded by wall frame members 16, comprising a header 18 at the top of the rough opening and vertical members or studs 20 on the hinge and latch sides of the door. The frame members may include liner members 22. The wall frame members may be covered with drywall 24 or other covering surface.

Figure 7:
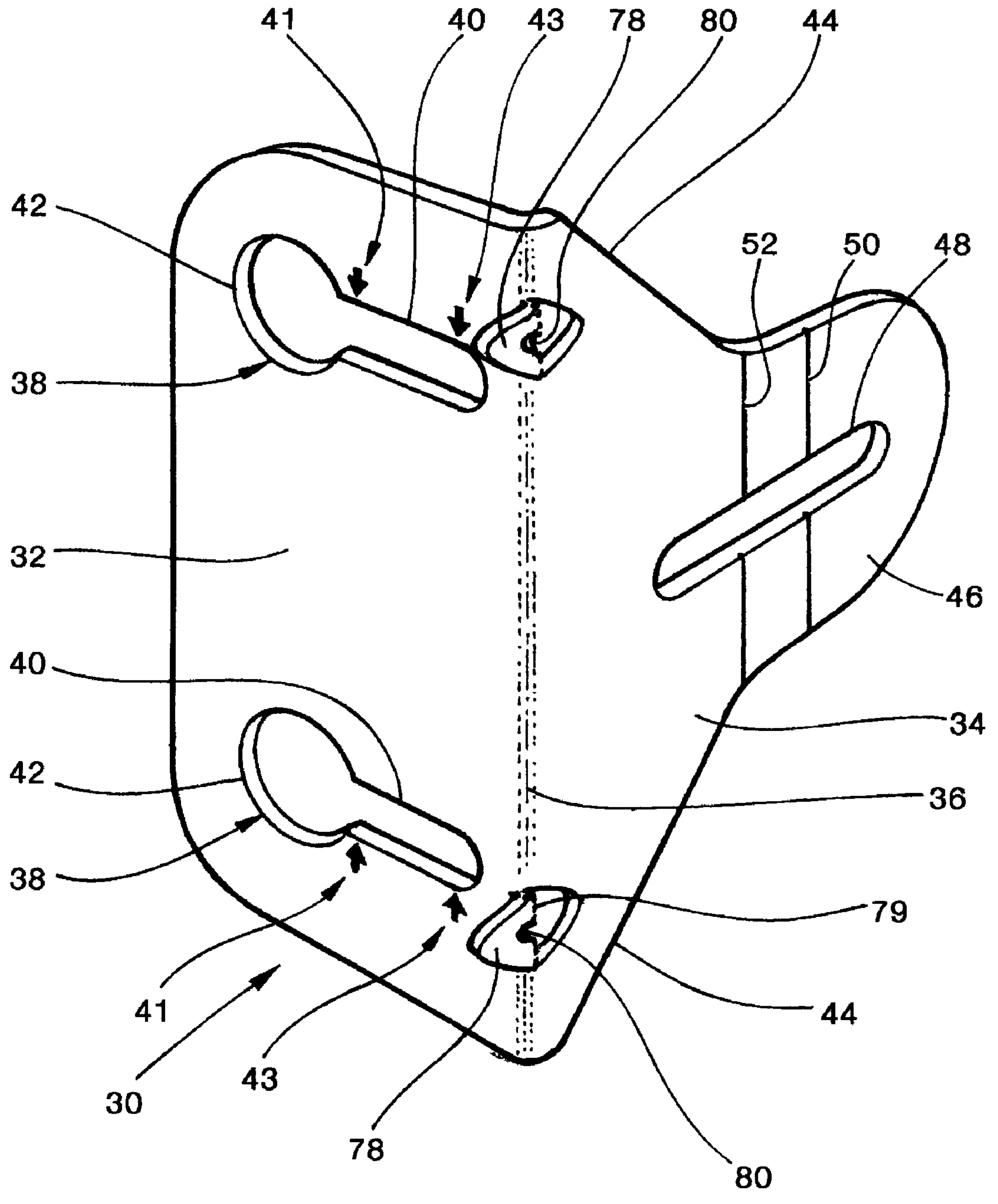
FIG. 7 is a perspective view of the jamb bracket of the present invention.

Jamb bracket 30 shown in FIG. 7 is a right angle member formed of a bendable sheet material, such as an anodized or other corrosion resistant metal. Bracket 30 includes a jamb flange 32 and a right angle wall flange 34, with edge 36 extending between the two flanges. Jamb flange 32 includes a pair of keyhole slots 38 extending from a narrow portion 40, adjacent edge 36, to an enlarged portion 42 at the end of the slot away from edge 36. Position markers 41 and 43 spaced along narrow portion 44 of keyhole slot 30 indicate proper mounting locations for mounting screws for mounting the jamb bracket to jamb 54 of pre-hung door assembly 10.

Wall flange 34 has inwardly tapered sides 44 extending away from edge 36, with tab 46 extending outwardly from the ends of tapered sides 44. A slot 48 is positioned in wall flange 34 and oriented perpendicularly to edge 36. A pair of positioning lines or indicators 50 and 52 extend transversely to slot 48 at spaced locations in order to facilitate aligning the flanges with a plumb line that is drawn on the wall about one-half inch from the door opening.

Pre-hung door assembly 10 includes door 56 mounted to door jamb 54 by hinges 58 on a hinge side 60 of the door jamb and door. The opposite side of the door jamb and door comprises a latch side 62 of the door and door jamb. The prefabricated door jamb also includes a header member 64 extending across the upper ends of side members 56 and 60. Typically, the door is preassembled in the jamb, and the entire door and jamb assembly is mounted as a unit in the door opening in the wall.

Figure 4:
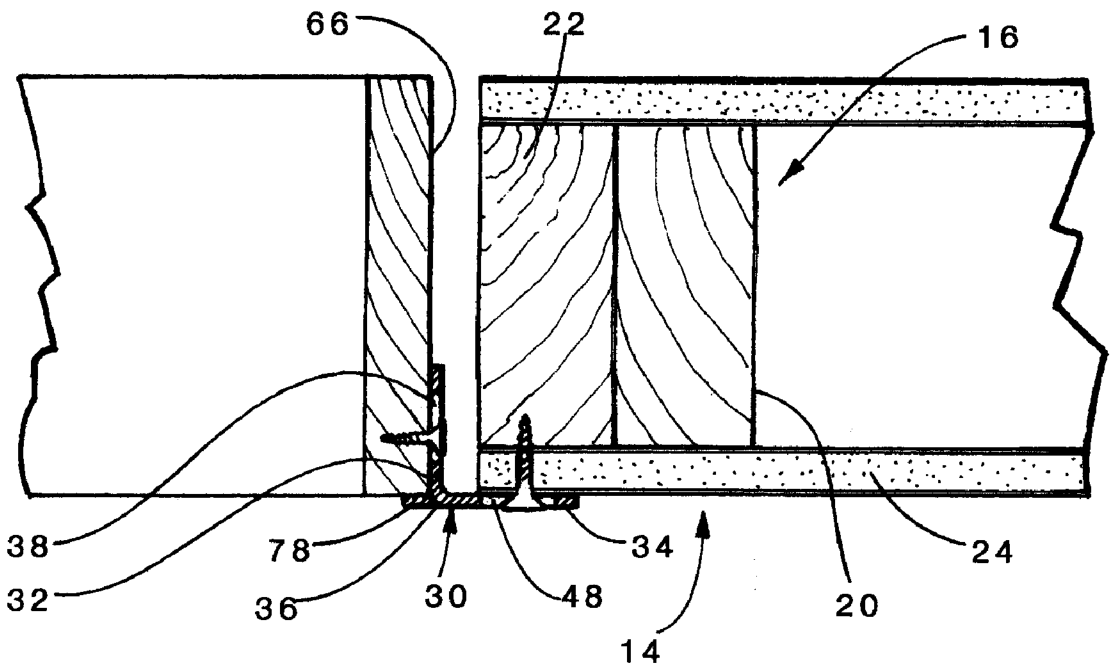
FIG. 4 is a horizontal sectional view showing the manner in which the jamb bracket of the present invention is attached between a frame surrounding a door opening in the building, with the flange bracket being mounted over a wall covering such as drywall.
Figure 5:
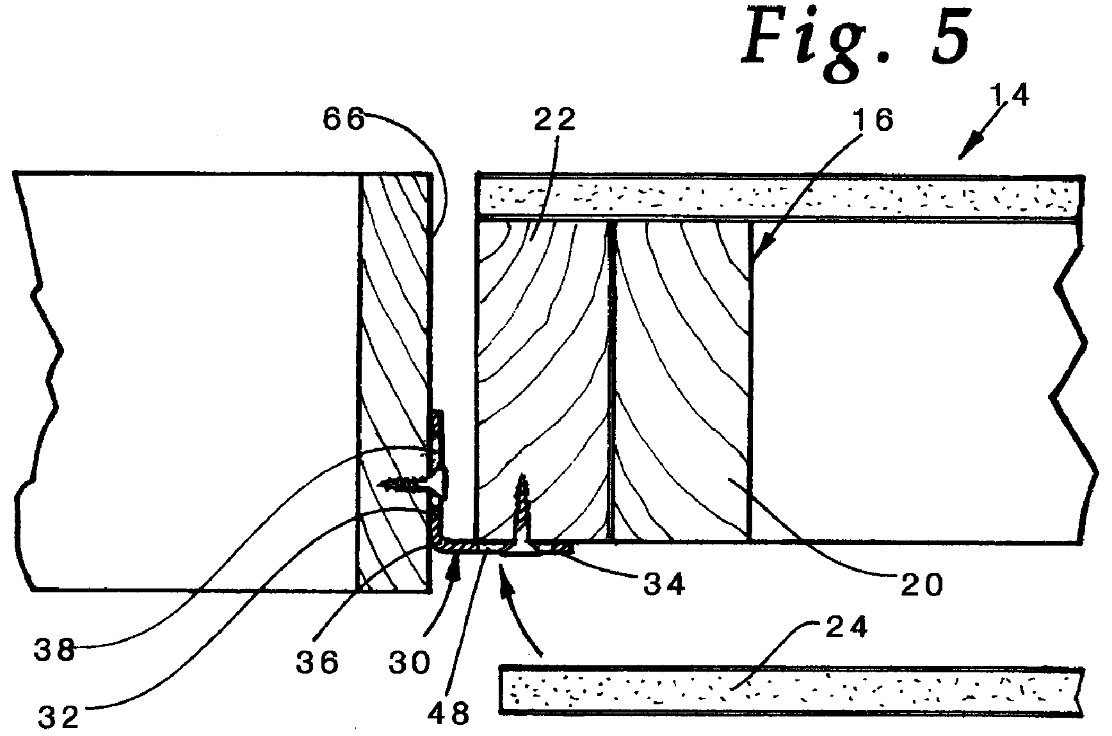
FIG. 5 is a view similar to FIG. 4, wherein the jamb bracket is mounted underneath the drywall or wall covering.
Figure 6A:
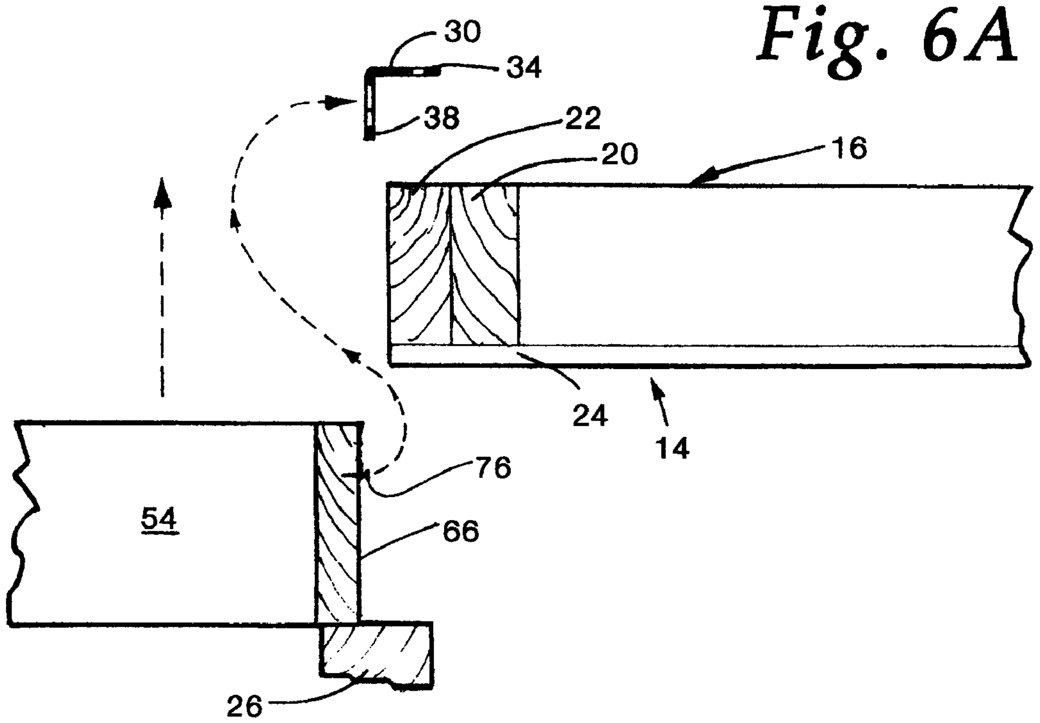
FIGS. 6A-6C are fragmentary horizontal sectional views showing the manner in which the jamb bracket of the present invention is used to attach a pre-hung exterior door in a door opening in a building, wherein the exterior door includes exterior trim or a nailing flange on an outer side of the jamb, and the exterior door is installed from the outer side of the building.
Figure 6B:
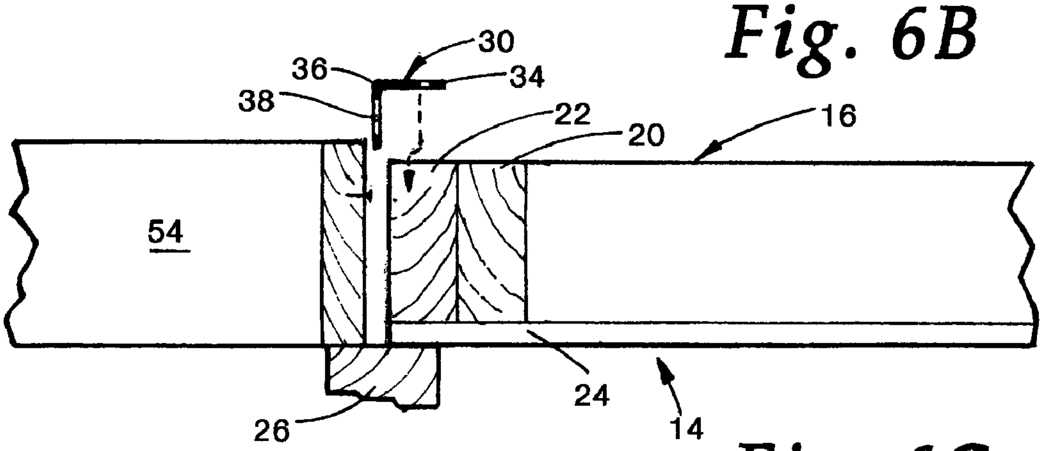
Figure 6C:
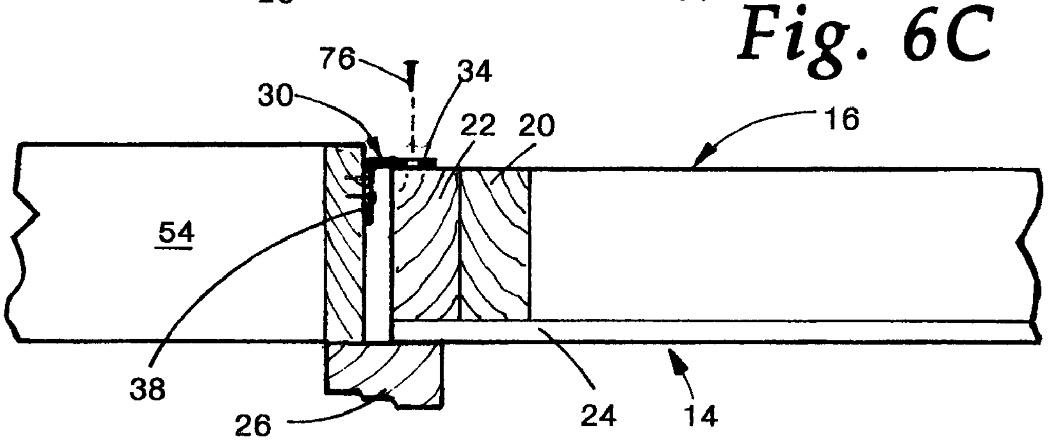

The jamb flange of bracket 30 is intended to be attached to outer side surfaces 66, 68 of door jamb 54, with wall flange 34 extending perpendicularly away from the jamb flange over the surface of wall 14. The proper positioning of the jamb flanges is determined by the nature of the wall to which the jamb is mounted. As shown in FIG. 5, if the jamb is mounted directly to the wall studs prior to the application of a wall surface 24 such as drywall, mark 43 is typically employed to determine the location of the jamb flange attachment screw. As shown in FIG. 4, if the door is to be mounted on a wall opening where the drywall is already in place, mark 41 would be employed to determine the proper location of where the jamb flange attachment screw is to be fastened. The position of the screw determines the location of the bracket, since the bracket is typically inserted on the screw to the end of the narrow slot.

A feature of the present invention is that the jamb flange attachment screws can be pre-attached at the factory, and the jamb flanges themselves can be releasibly attached to the jambs, so that all the parts, preassembled, are delivered together at the job site, and it is unnecessary to obtain and install jamb flanges at the installation site.

While the preattachment of the jamb flanges and fastener screws is a convenience, the releasable attachment of the jamb flange to the jamb by means of the key hole slots is functionally important in certain circumstances for another reason. For example, when the jamb brackets are used for exterior doors wherein brick molding, a nailing flange or exterior trim 26 or the like is pre-attached to the exterior side of the jamb and extends sideways beyond the periphery of the door opening, the door assembly cannot be installed from the inside but must be installed from the outside. In order to attach the jamb brackets on the inside edge of the door jamb, the jamb flanges cannot be pre-attached to the jamb before installation of the jamb in the wall opening, because the protruding wall flanges of the attached jamb brackets would not fit through the door opening. Thus, in this case it is essential that the jamb flanges be attached to the jamb after the door assembly is positioned in the door opening.

The same problem is present in an installation where jamb flanges are to be mounted on both the inner and outer side edges of the jamb. Installation of at least some of the jamb brackets after the jamb has been positioned in the door opening is essential in such a situation because the jamb cannot be inserted in the door opening with wall flanges extending outwardly from both sides of the jamb.

Normal jamb brackets cannot be used in such a situation, but the brackets of the present invention can. The door assembly is first positioned in the door opening, then the jamb flanges are installed by fitting the enlarged portions of the key hole slots over the pre-installed screws in the jamb and then sliding the jamb flange into the proper position, with the screws snugly engaging the flange sides adjacent the narrow slots.

Before the jamb is installed, the jamb flange screws can be tightened in the jamb so that they snugly engage and hold the jamb flange in place. A two-headed or duplex head screw can be used to make sure that the screw head will engage the jamb flange snugly.

Figure 8:
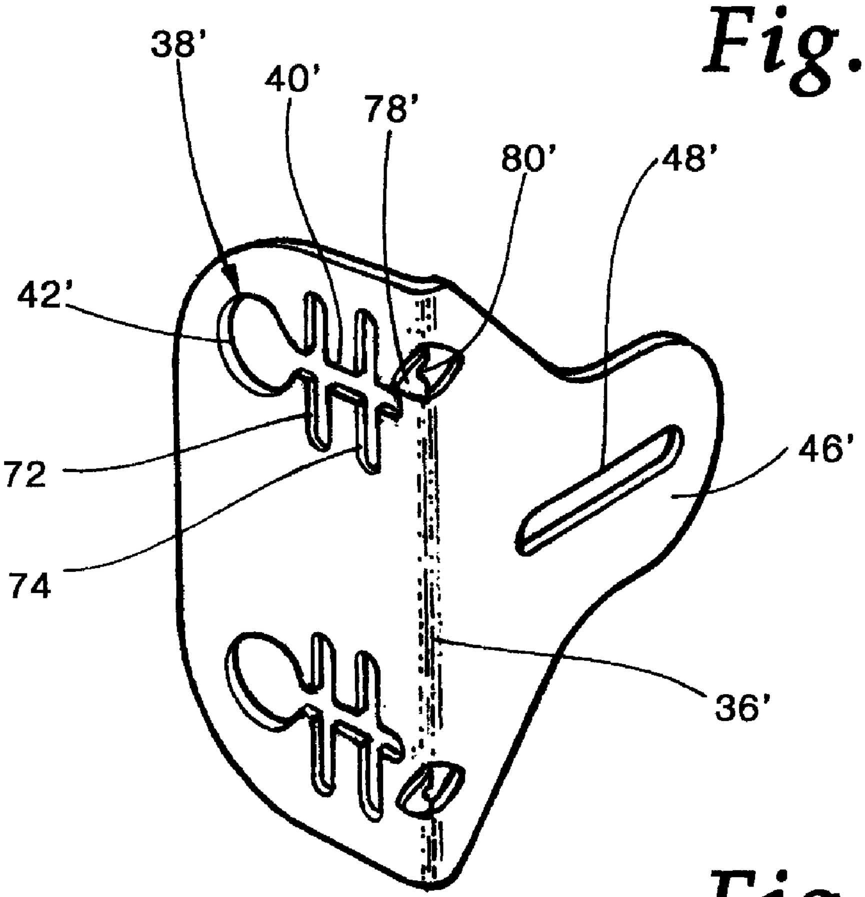
FIG. 8 is a perspective view of a second embodiment of the jamb bracket of the present invention, wherein the key hole slot has transverse slots for properly positioning the jamb flange on mounting screws.
Figure 9:
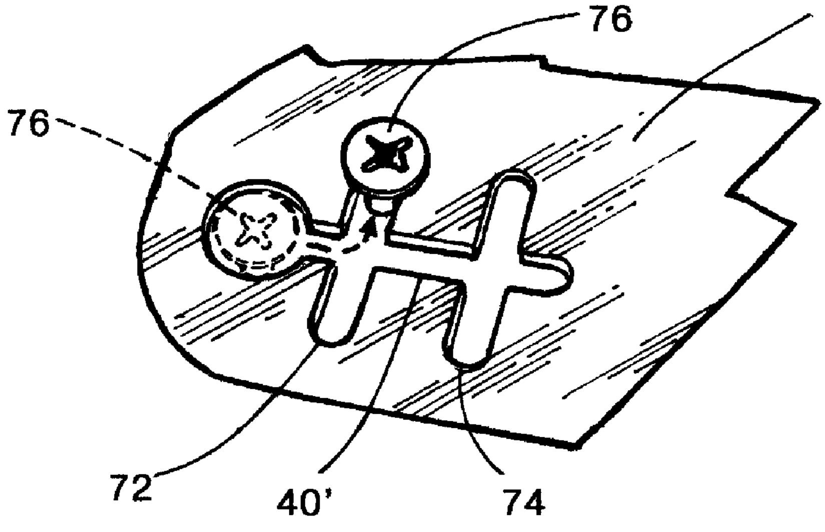
FIG. 9 is a fragmentary view showing the manner in which a jamb bracket of FIG. 8 is nested on a mounting screw.

In order to even more securely attach the jamb flanges in their desired positions, where the jamb flange slot fits snugly under the screw's head, and more positively locate the jamb flange in position, an alternative jamb bracket 30' can be provided with key hole slots 38' that have one or more transverse indentations or slots 72 and 74 along the narrow portions 40' of slots 38' as shown in FIG. 8. In the exemplary embodiment, the transverse slots 72 and 74 extend upwardly and downwardly from narrow slot 38'. The transverse slots may be referred to as vertical slots for convenience, even though the actual orientation of the slots will vary depending on whether the bracket is used on the side or top of the door jamb. The remaining components of bracket 30' that are the same as bracket 30 are identified with the same numerals as bracket 30, except they are primed. After the jamb flange is installed on the screws 76 so that the heads the screws extend into narrow slots 40', the jamb flange is then slid downwardly so the screw shank fits in the appropriate one of the vertical slots. This holds the screws in a fixed longitudinal position in the jamb slot longitudinally.

Once the jamb flange is mounted on the jamb, the door is plumbed by reference to lines 50 or 52 and the wall flange is attached to the door opening. In one typical installation, the wall flange is mounted over a wall covering such as drywall 24, as shown in FIG. 4. Positioning tabs or alignment stops 78 extend perpendicularly from jamb flange 32 at edge 36. These tabs engage the edge of the jamb as the jamb flange is slid inwardly on the jamb, positioning edge 36 at the edge of the jamb. This positions the edge of the door jamb at the surface of the wall, which is normally desirable. However, sometimes it is desired to position the wall flange behind the drywall or otherwise further inwardly on the jamb, as shown in FIG. 5. To do this, tabs 78 can be bent out of the way to let the edge 36 of the jamb bracket slide inwardly past the edge of the jamb. A score mark 79 is formed in the flange at the base of the tab 78 to weaken the tab at the base to facilitate bending or removal of the tab from the bracket. Bending or breaking of the tab can also be facilitated by the provision of a hole 80 at the edge of the tab where it is bent. This weakens the tab where it is bent and makes it easier to bend the tab out of the way or break it off. Either or both the score mark 79 or opening 80 can be used, although the score mark is desirably used whether or not the additional hole is used. The length of the key hole slot is desirably selected so that the jamb flange can be slid inwardly or outwardly as necessary along the slot so the wall flange will fit over or under a drywall covering. The positioning or alignment tabs are broken off or bent flat so the bracket can be slid inwardly past the edge of the jamb so the door flange will fit behind the wall board, as shown in FIG. 5.

While the alignment tabs are helpful in positioning the jamb brackets at the edge of a jamb in most situations, the jamb brackets can also be made without any alignment tabs so the brackets can be used under or over the drywall without any modification of alignment tabs.

It should be understand that the foregoing is merely exemplary of the preferred practice of the present invention and that various changes in the arrangements and details of construction of the embodiments disclosed herein may be made without departing from the spirit and scope of the present invention.

What is claimed is:

1. A jamb mounting bracket for mounting a door jamb in an opening in a wall, the jamb mounting bracket comprising a jamb flange and a wall flange joined together at right angles to each other at an edge, the jamb flange including one or more jamb attachment slots therein extending in a direction away from the edge, the slots having enlarged and narrow portions, with the enlarged portion being further from the edge than the narrow portion, the slots being formed such that a head of an attachment screw attached to an outer side of the jamb will fit through the enlarged portion but not through the narrow portion and the shank of the screw will fit through the narrow portion, such that the jamb flange can be mounted. on the screw by fitting the enlarged portion over the head of the screw and then sliding the jamb flange inwardly until the shank of the screw head is positioned in the narrow portion, the wall flange having a fastener attachment opening therein, the wall flange being attachable to the wall by extending a fastener through the fastener attachment into the wall, and an alignment tab at the edge that engages an edge of the jamb to position the edge of the bracket at the edge of the jamb, the tab having at least one of a score line at its base and an opening therein that facilitates breaking or bending the tab so the edge of the bracket is not stopped by the tab at the edge of the jamb.

2. A jamb mounting bracket as in claim 1 wherein the bracket includes an alignment tab at the edge that engages an edge of the jamb to position the edge of the bracket at the edge of the jamb, wherein. the at least one of a score line and an opening consists of an opening in the tab that facilitates breaking or bending the tab so the edge of the bracket is not stopped by the tab at the edge of the jamb.

3. A jamb mounting bracket as in claim 1 wherein the jamb attachment slots are key-hole shaped slots having an enlarged opening at an end positioned away from the edge and a relatively narrow slot extending from the enlarged opening toward the edge, the enlarged opening and narrow slot corn prising the enlarged and narrow portions of the jamb attachment slot, a head of the screw fitting through the enlarged opening but not through the narrow slot, a shank of the screw fitting through the relatively narrow slot, the bracket being formed such that the bracket can be mounted on a screw threaded into an outer side of the jamb by first placing the enlarged opening in the jamb flange over the head of a screw and then sliding the jamb flange inwardly such that the shank of the screw is positioned in the relatively narrow slot in the jamb flange.

4. A jamb mounting bracket as in claim 1 wherein the bracket includes position markers along the jamb attachment slot to indicate where screws should be attached to the jamb for properly positioning the jamb bracket.

5. A jamb mounting bracket for mounting a door jamb in a door opening, the jamb mounting bracket including a jamb flange and a wall flange joined together at right angles to each other at an edge, the jamb flange including one or more jamb attachment slots therein extending in a direction away from the edge, the slots having enlarged and narrow portions, with the enlarged portion being further from the edge than the narrow portion, the slots being formed such that a head of a jamb attachment screw attached to an outer side of the jamb will fit through the enlarged portion but not through the narrow portion and the shank of the screw will fit through the narrow portion,such that the jamb flange can be mounted on the screw by fitting the enlarged portion over the head of the screw ant then sliding the jamb flange inwardly until the shank of the screw head is positioned in the narrow portion, and including one or more transverse slots extending transversely from the jamb attachment slots, the transverse slots being formed at a position with respect to the jamb attachment slots such that the jamb flange is properly positioned horizontally with respect to the jamb when the jamb attachment screw is positioned in the transverse slot, and the wall flange having a fastener attachment opening therein, the wall flange being attachable to a wall by extending a fastener through the fastener attachment opening into a wall.

6. A jamb mounting bracket as in claim 5 wherein the jamb flange includes at least two transverse slots spaced such that the slots can position the jamb flange properly for mounting the wall flange of the jamb mounting bracket over or under drywall on a building frame structure adjacent the door opening.

7. A jamb mounting bracket as in claim 6 wherein the jamb bracket includes transverse slots on opposite sides of the narrow portion of the jamb attachment slot.

8. A jamb mounting bracket as in claim 5 wherein the opening in the wall flange comprises a fastener attachment slot that extends in a direction away from the edge.

9. A jamb mounting bracket as in claim 5 wherein the bracket comprises a single sheet of metal, with the wall flange and jamb flange being bent at right angles to each other along the edge.

10. A jamb mounting bracket as in claim 8 wherein the wall flange includes separate position markers for maintaining proper vertical alignment of the jamb in the wall opening.

* * * * *